May 21, 1957

R. D. MAY ET AL 2,792,645

DRIFTMETER SIMULATOR

Filed March 18, 1954

INVENTORS
RICHARD D. MAY
NILS B. MICKELSON
BY

*Erwin B. Steinberg*
AGENT.

May 21, 1957   R. D. MAY ET AL   2,792,645
DRIFTMETER SIMULATOR
Filed March 18, 1954                                     2 Sheets-Sheet 2

INVENTORS
RICHARD D. MAY
NILS B. MICKELSON
BY
Ervin B. Steinberg
AGENT.

United States Patent Office 2,792,645
Patented May 21, 1957

2,792,645

DRIFTMETER SIMULATOR

Richard D. May, Westport, and Nils B. Mickelson, Stamford, Conn., assignors to The Reflectone Corporation, Stamford, Conn., a corporation of Connecticut Application March 18, 1954, Serial No. 417,089

6 Claims. (Cl. 35—10.2)

This invention relates to a training device for aircraft navigators and has specific reference to an instrument for teaching the reading of drift angle and of ground speed as encountered in aircraft navigation. The device described hereinafter is used primarily for synthetic training, i. e. for classroom instruction on ground whereby the operation of conventional airborne driftmeters is simulated in a realistic and accurate manner.

One of the objects of this invention is to provide a synthetic training device which simulates the presentation and operation of operational driftmeters.

Another object of this invention is to provide a driftmeter simulator which may be used for instructional purposes, particularly for reading of drift angle and of ground speed.

Another object of this invention is to provide a driftmeter simulator which simulates in a realistic manner the appearance of the ground when taking driftmeter readings at conventional flying altitudes.

Still another object of this invention is a provision of illuminating means for simulating the appearance of ground as viewed from an aircraft during day light and during night.

In general, the invention comprises a cradle mounted for pivotal motion and supporting a movable belt. Means are provided to drive said belt at a speed proportional to ground speed of the aircraft simulated. A pivotally mounted light deflecting means is positioned for communication with a portion of the belt and receives an image therefrom. An optical system is provided which presents the image received by the image deflecting means at a stationary point. Further means are provided to pivot the cradle about an angle corresponding to the drift of the aircraft simulated.

For a better understanding of the present invention together with other and further objects thereof reference is made to the following description taken in connection with accompanying drawings in which.

Figure 1:
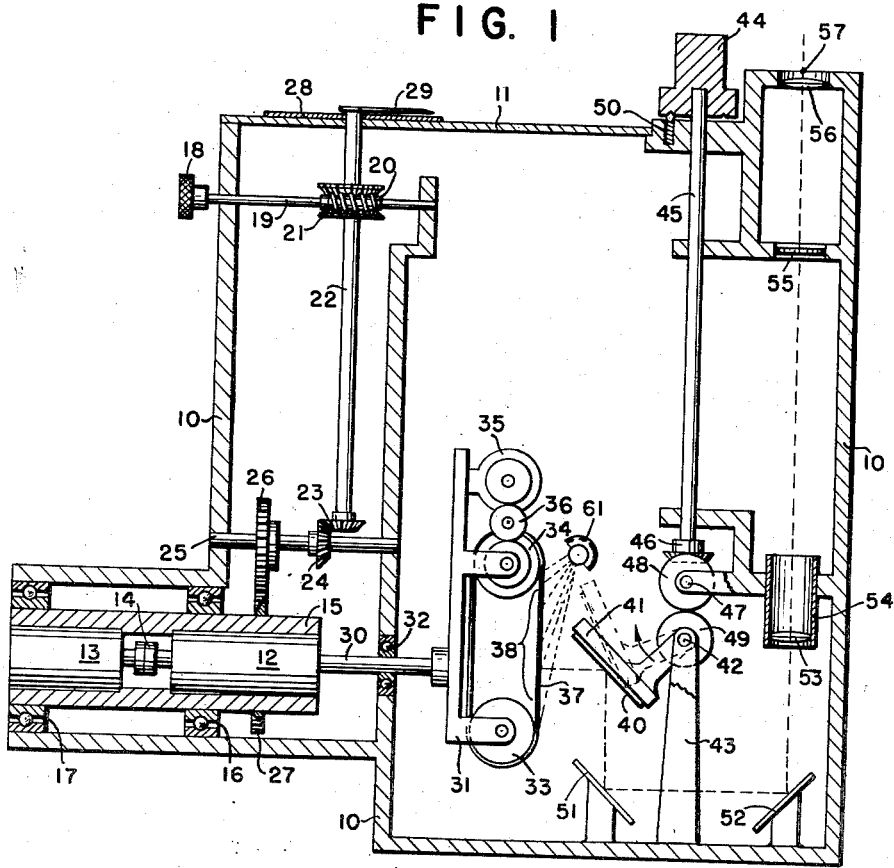
Figure 1 is an elevation view of the driftmeter partly in section.

Referring to Figure 1, numeral 10, identifies a stationary frame which supports nearly all parts of the driftmeter. A top plate 11 serves to exclude ambient light from reaching the inside of the frame. A synchro 12 and a servomotor 13 which form part of a conventional servo mechanism are coupled together by coupling 14. The stators of the synchro 12 and motor 13 are retained in an annular sleeve 15 which is rotatable with respect to stationary frame 10 by virtue of ball bearings 16 and 17. Sleeve 15 retaining the electro-mechanical parts of the servo system may be rotated with respect to frame 10 by operating knob 18 which is attached to shaft 19 and which transmits through worm 20, worm gear 21, shaft 22, bevel gears 23 and 24, shaft 25, and spur gear 26, its rotation to annular spur gear 27 which is attached to the periphery of sleeve 15. The rotation of sleeve 15 and of the stators of the electro-mechanical components of the servo system is indicated on dial 28 operating in combination with pointer 29 attached to shaft 22.

The rotor of synchro 12 is equipped with a shaft 30 which is rigidly connected to a cradle 31. Cradle 31 therefore pivots in response to rotation produced by shaft 30. The weight of cradle 31 is relieved by means of a ball bearing 32 supported in frame 10.

The cradle 31 supports a pair of spaced rollers 33 and 34 respectively. Stepped roller 34 is driven via intermediate roller 36 by a variable speed drive means 35, preferably a variable speed electric motor having a roller mounted on its output shaft. A flexible belt 37 is supported about these rollers and is driven in response to motion imparted to the roller 34 by variable speed means 35. The belt 37 is equipped with discernible markings, or in the preferred embodiment, an aerial photograph is mounted upon the outer surface of a rubber belt. Belt 37 traverses a substantially straight path 38 which is disposed intermediate rollers 33 and 34. It will be apparent that the rollers may be crowned in order that the belt remain centered.

A light reflecting mirror 40 is supported on a bracket 41 which is mounted for pivotal motion with shaft 42 held in standoff bracket 43. The mirror is mounted in such a manner that it will reflect an image from a part of the substantially straight portion 38 of the belt 37. As the mirror is pivoted about the axis of shaft 42, it scans the substantially straight portion 38.

Movement of mirror 40 is effected by knob 44 fastened to shaft 45, through bevel gear 46, a matching bevel gear (not shown), shaft 47, roller 48 fastened to shaft 47 and frictionally engaging roller 49 attached to shaft 42. A detent mechanism 50, the purpose of which will be explained later, is provided in order to obtain predetermined calibrated rotation of knob 44 relative to stationary frame 10.

The image reflected by mirror 40 is transmitted to a pair of stationary mirrors 51 and 52, reflected from there through a suitable lens 53 contained in lens barrel 54, to form an image in the plane of reticle 55. The image is seen by a student applying his eye at point 57 and looking through eyepiece 56 at the reticle 55.

Figure 4:
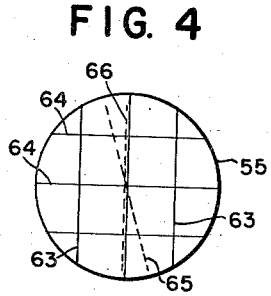
Figure 4 is a schematic view of the reticle used in the device.

The construction of the reticle 55 is schematically shown in Figure 4 wherein the reticle is equipped with hair lines 63 in the longitudinal direction and with lines 64 in the transverse direction. These hair lines serve for indexing purposes.

Figure 3:
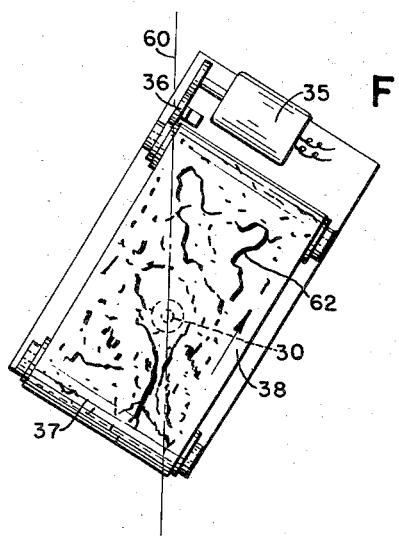
Figure 3 is a view of a portion of the device, shown in shifted position.

The operation of this device may be visualized as follows: By way of the servo mechanism an instructor applies a signal to the synchro 12 causing shaft 30 and cradle 31 to assume an angular position which is proportional to the drift angle of the aircraft simulated. The synchro stator and sleeve 15 are prevented from moving relative to frame 10 by the combination of the worm 20 and worm gear 21. Such an angular displacement of the cradle with belt is depicted in Figure 3 wherein the cradle is displaced relative to the vertical reference line 60. At the same time, by means of motor 35, the terrain belt 37 is driven at a speed corresponding to the ground speed of the aircraft.

Illuminating means 61 (Figure 1) illuminate the markings 62 (Figure 3) of the belt.

A student looking through eyepiece 56 will see the terrain markings moving relative to indexing lines 63 and 64. If the student fixes his sight on a selected image, this image will move along a straight line (for instance dotted line 65) as the belt traverses the substantially flat portion 38. Seeing that this object fails to move parallel to the longitudinal index lines 63, it will become apparent that a drift exists. In order to determine the drift angle, the student will turn knob 18 which causes sleeve 15 to rotate thereby moving synchro 12 relative to frame 10 until the selected terrain markings move parallel to the longitudinal indexing lines 63 as shown by dotted line 66. When this occurs the amount of drift introduced by the instructor and corrected by the student will be apparent by virtue of the combination of dial 28 and indicator 29. In this condition the cradle 31 has been returned to its vertical position.

In order to determine the ground speed of the simulated aircraft, the student selects a certain marking on the belt and maintains an image of this marking stationary with respect to transverse indexing lines 64. This is accomplished by turning knob 44 in such a way that pivotally mounted mirror 40 follows the selected marking as this marking traverses the substantially straight portion of the belt. Since knob 44 is equipped with a detent mechanism 50, the time necessary to turn this knob from one detent to the next detent will be a measure of the speed with which the mirror has to be turned and is also a measure of the speed of the belt representing the ground speed of the aircraft.

It will be apparent that accurate ground speed measurements can be made only when the cradle has been returned to its vertical position, i. e. when the drift angle has been first established. In order to attain the desired accuracy it is required to rotate the mirror about an axis which is parallel to the plane containing the axes of rollers 33 and 34.

To simulate the appearance of ground speed during daylight, it has been found advantageous to employ incandescent lamps with electrical circuit provision to adjust the illuminating intensity. For night conditions, excellent results have been achieved by providing the belt with small luminescent markings used in combination with a stationary source of ultraviolet energy. The luminescent markings when energized give the appearance of street lights, etc.

Figure 2:
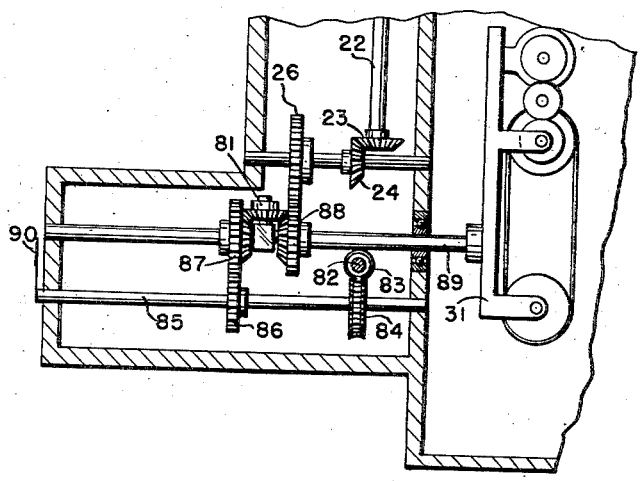
Figure 2 is a fragmentary view incorporating a modification of the construction shown in Figure 1.

Figure 2 shows an alternate design in which the servo mechanism using electro-mechanical positioning means is replaced by a mechanical differential 81. The instructor's input to the driftmeter is provided by a knob (not shown) on shaft 82, worm 83 fastened thereon, and worm gear 84 fastened to shaft 85. A gear 86 fastened to shaft 85 engages the first input gear 87 of differential 81. The student operates shaft 22, bevel gears 23 and 24, and gear 26 which engages the other input gear 88 of differential 81. Shaft 89 constitutes the output from the differential and is connected to the cradle 31. An indicator 90 indicates the drift angle set into the driftmeter by the instructor. When the student takes a measurement of the drift angle, his reading obtained on dial 28 (Figure 1) should coincide with the indications obtained by means of indicator 90.

Figure 5:
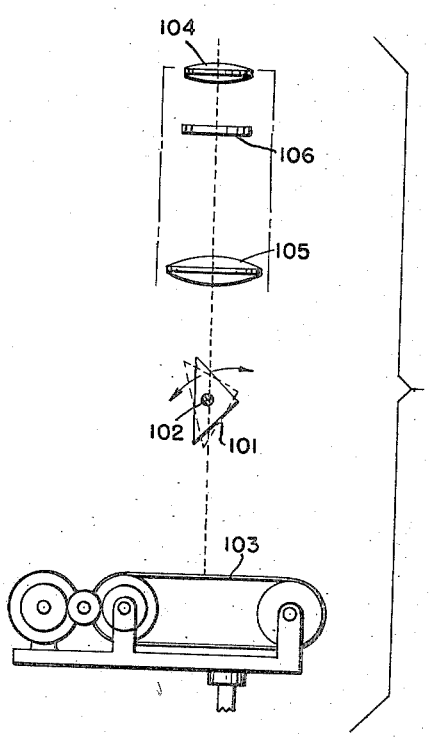
Figure 5 is a schematic view of an alternate optical arrangement.

Figure 5 shows in a schematic manner a variation of the optical system. A rotatable prism 101 is employed instead of the movable mirror 40 (Figure 1). The prism is capable of pivotal movement about the axis of shaft 102. It will be apparent to those skilled in the art that the prism is held in a supporting structure in such a manner that the path of the light through the prism is not impaired. By tilting the prism, the advance of a selected marking on belt 103 may be seen as a stationary image through eyepiece 104. As described in connection with Figure 1, an image forming lens 105 and a stationary reticle 106 complete the optical system. Stationary mirrors may be used in order to deflect the light path or to shorten the mechanical configuration. Although the cradle is shown in a horizontal position it will be apparent that by proper arrangement or reorientation of the prism and/or the use of stationary mirrors the cradle may occupy any desired angle relative to the horizontal and vertical axis of the supporting structure.

Regarding the general design of electro-mechanical servo mechanisms which employ the combination of a synchro, servo motor and electronic amplifier reference is made to the book entitled "Electronic Instruments" by I. A. Greenwood, Jr. et al., Massachusetts Inst. of Technology Radiation Laboratory Series, McGraw-Hill Book Co., Inc., New York, N. Y. 1948, particularly part II subheaded "Instrument servo mechanisms."

Several other and further modifications are possible as will be apparent to those skilled in the art. The belt driving means 35 supported on the cradle 31, for instance, could be mounted on frame 10. Flexible shaft means then could serve as the driving connection between the motor and belt roller 34.

While there have been described and illustrated specific embodiments of the invention, it will be obvious that various changes and modifications may be made therein without departing from the field of the invention which should be limited only by the scope of the appended claims. Other features of the invention disclosed and described are claimed in the co-pending application for Letters Patent Serial No. 419,399 with filing date of March 29, 1954.

What is claimed is:

1. A driftmeter simulator comprising a stationary frame; an electro-mechanical positioning means including a stator and a rotor supported by this frame; the stator of said electro-mechanical means mounted for rotation about its longitudinal axis relative to said stationary frame; means to displace said stator from an initial position and retain it in said displaced position; a cradle connected to said rotor and being adapted for pivotal motion in response to motion imparted to said rotor; said cradle supporting a movable belt; means to drive said belt; pivotally mounted means for deflecting light in communication with a portion of the belt and receiving an image therefrom, and an optical system for presenting the image received by said deflecting means at a stationary point.

2. A driftmeter simulator comprising a stationary frame; an electro-mechanical positioning means including a stator and a rotor supported by this frame; the stator of said electro-mechanical means mounted for rotation about its longitudinal axis relative to said stationary frame; means to displace said stator from an initial position and retain it in said displaced position; a cradle coupled to said rotor and being adapted for pivotal motion in response to motion imparted to said rotor; said cradle supporting a plurality of rollers; an endless flexible belt having markings supported on said rollers; variable speed drive means adapted to drive said belt; a light deflecting means positioned for communication with a portion of said belt and receiving an image of said markings; an optical system for presenting the image received by said deflecting means at a stationary point, and said deflecting means mounted for pivotal motion to produce a stationary image of said markings at said stationary point as the belt traverses a predetermined distance.

3. A driftmeter simulator comprising a stationary frame; an electro-mechanical positioning means including a stator and a rotor supported by this frame; the stator of said electro-mechanical means mounted for rotation about its longitudinal axis relative to said stationary frame; means to angularly displace said stator from an initial position and retain it in said displaced postion; means to indicate the angular displacement of said stator; a cradle coupled to said rotor and being adapted for pivotal motion in response to motion imparted to said rotor; said cradle supporting at least two spaced rollers having parallel axes of rotation; a flexible, endless belt equipped with markings supported on the rollers; variable speed drive means adapted to drive said belt for rotation about said rollers; a light deflecting means positioned for communication with a portion of the belt and receiving an image of said markings; an optical system for presenting said image at a stationary point; said deflecting means mounted for pivotal motion about an axis parallel to the plane containing the axes of said rollers, and means to pivot said deflecting means to produce a stationary image of said markings at said stationary point as the belt traverses a predetermined distance.

4. A driftmeter simulator comprising a stationary frame; an electro-mechanical positioning means including a stator and a rotor supported by this frame; the stator of said electro-mechanical means mounted for rotation about its axis relative to said stationary frame; means coupled to said stator for angularly displacing the stator relative to said frame; means to indicate the angular displacement of said stator; a cradle coupled to said rotor and being adapted for pivotal motion in response to motion imparted to said rotor; said cradle supporting at least two spaced rollers having parallel axes of rotation; a flexible endless belt equipped with discernible markings supported on said rollers and defining a substantially straight portion intermediate said rollers; variable speed drive means for driving said belt about said rollers; a movable light deflecting means positioned for communication with the substantially straight portion of the belt and receiving an image of said markings; an optical system for presenting said image at a stationary point; stationary reference markings disposed in said optical system to indicate pivotal displacement of said cradle; said deflecting means mounted for pivotal motion about an axis parallel to the plane containing the axes of said rollers; and means to pivot said deflecting means to produce a stationary image of selected markings at said stationary point as said markings traverse a predetermined distance along the substantially straight portion of the belt.

5. A driftmeter simulator comprising a stationary frame; an electro-mechanical positioning means including a stator and a rotor supported by this frame; the stator of said electro-mechanical means mounted for rotation about its axis relative to said stationary frame; means coupled to said stator for angularly displacing the stator relative to said frame; means to indicate the angular displacement of said stator; a cradle coupled to said rotor and being adapted for pivotal motion in response to motion imparted to said rotor; said cradle supporting spaced rollers; a flexible endless belt equipped with discernible markings supported on said rollers and defining a substantially straight portion intermediate said rollers; variable speed drive means for driving said belt about said rollers; a movable light deflecting means positioned for scanning the substantially straight portion of the belt and receiving an image of said markings; an optical system including a mirror, a lens and a reticle for presenting said image at a stationary point; said reticle adapted to indicate angular displacement of said cradle; said deflecting means mounted for pivotal motion to receive images from a plurality of markings along the substantially straight portion of the belt; means to pivot said deflecting means to produce a stationary image of a selected marking at said stationary point as said marking traverses a predetermined distance along the substantially straight portion of the belt, and means to illuminate that portion of the belt in communication with said deflecting means.

6. A driftmeter simulator comprising a stationary frame; an electro-mechanical positioning means including a stator and a rotor supported by this frame; the stator of said electro-mechanical means mounted for rotation about its axis relative to said stationary frame; means coupled to said stator for angularly displacing the stator relative to said frame; means to indicate the angular displacement of said stator; a cradle coupled to said rotor and being adapted for pivotal motion in response to motion imparted to said rotor; said cradle supporting spaced rollers; a flexible endless belt carrying an aerial photograph with discernible markings supported on said rollers and defining a substantially straight portion intermediate said rollers; variable speed drive means for driving said belt about said rollers; a movable light deflecting means positioned for scanning the substantially straight portion of the belt and receiving an image of said markings; an optical system including a mirror, a lens and a reticle for presenting said image at a stationary point, said reticle adapted to indicate angular displacement of said cradle; said deflecting means mounted for pivotal motion to receive images from a plurality of markings along the substantially straight portion of the belt; means to pivot said deflecting means to produce a stationary image of a selected marking at said stationary point as said marking traverses a predetermined distance along the substantially straight portion of the belt; means to illuminate that portion of the belt in communuication with said deflecting means, and said means including the combination of luminescent markings on said belt rendered visible by a source of ultraviolet energy.

References Cited in the file of this patent

UNITED STATES PATENTS

| | | |
|---|---|---|
| 2,294,408 | Karnes | Sept. 1, 1942 |
| 2,321,799 | Cone et al. | June 15, 1943 |
| 2,345,744 | Glenny | Apr. 4, 1944 |
| 2,413,633 | Jones | Dec. 31, 1946 |
| 2,428,432 | Park | Oct. 7, 1947 |
| 2,458,448 | Tuttle | Jan. 4, 1949 |
| 2,505,094 | Bunyan | Apr. 25, 1950 |
| 2,506,998 | Dehmel | May 9, 1950 |
| 2,662,305 | Alric | Dec. 15, 1953 |